United States Patent [19]

Perry et al.

[11] 4,042,937
[45] Aug. 16, 1977

[54] INK SUPPLY FOR PRESSURIZED INK JET

[75] Inventors: Francis James Perry, Morgan Hill; Anthony Vesci, San Jose, both of Calif.

[73] Assignee: International Business Machines Corporation, Armonk, N.Y.

[21] Appl. No.: 691,699

[22] Filed: June 1, 1976

[51] Int. Cl.² ............................................. G01D 15/18
[52] U.S. Cl. ............................................ 346/1; 346/75; 346/140 R
[58] Field of Search ........................... 346/1, 75, 140; 222/318

[56] References Cited
U.S. PATENT DOCUMENTS

| 3,661,304 | 5/1972 | Martinez et al. | 346/75 X |
| 3,852,773 | 12/1974 | Sicking et al. | 346/140 |
| 3,891,121 | 6/1975 | Stoneburner | 346/75 X |
| 3,950,761 | 4/1976 | Kashio | 346/75 X |
| 3,970,222 | 7/1976 | Duffield | 346/75 X |
| 3,974,508 | 8/1976 | Blumenthal | 346/140 R |

FOREIGN PATENT DOCUMENTS

| 2,315,151 | 10/1974 | Germany | 346/75 |
| 2,317,911 | 10/1974 | Germany | 346/75 |

OTHER PUBLICATIONS

Jensen, D. F. et al; High Speed Valve for an Ink Jet Printer, IBM Tech. Disc. Bulletin, vol. 18, No. 5, Oct. 1975, pp. 1345–1346.

Primary Examiner—George H. Miller, Jr.
Attorney, Agent, or Firm—John H. Holcombe; Otto Schmid, Jr.

[57] ABSTRACT

Ink supply system and sequencing for purge, startup, operation, and shutoff of pressurized ink jet systems. Employing an ink jet head having an inlet, startup is accomplished by filling the head with ink, closing an inlet valve, building pressure behind the valve to a level significantly greater than required for operation, and opening the valve. The system includes an inlet valve connecting a pump from a reservoir to the ink jet head, and an outlet valve connecting an outlet from the head to the reservoir and a vacuum source. At shutoff, the inlet valve is closed with the outlet valve open to create a negative pressure in the head.

14 Claims, 2 Drawing Figures

INK SUPPLY FOR PRESSURIZED INK JET

BACKGROUND OF THE INVENTION

Starting, controlling and shutting off pressurized ink systems without an excessive splattering of ink over the components of the ink jet system has long been a difficult goal to achieve. Examples of pressurized ink jet systems include magnetic ink jet systems such as taught by Fan et al, U.S. Pat. No. 3,805,272, and electrostatic pressure ink jet systems such as the deflected type, for example, as taught by Sweet, U.S. Pat. No. 3,596,275. Such pressurized ink jet systems project one or more streams of ink which are perturbated to break into streams of drops. For electrostatic deflected systems, each drop in a single stream of ink drops is selectively charged at drop breakoff and passed through a uniform deflection field to impact various locations on a recording medium in accordance with the quantum of the charge. Thus, by applying suitable charging signals to the drops, a visible human-readable record may be formed on the recording medium.

The problem of splattering ink on system components becomes much more critical in binary types of pressurized ink jet systems such as taught by Sweet et al U.S. Pat. No. 3,373,437. The binary type of electrostatic system employs a plurality of jets in one or more rows, selectively charging drops at drop breakoff with a single charge amplitude to be deflected by a constant field to an ink drop gutter. The uncharged drops continue along the original jet stream paths to impact the recording medium. A visible human-readable printed record may thus be formed by leaving uncharged those drops required for printing during relative head-to-record medium motion.

A requirement of the multi-jet binary systems is that the jets be closely spaced, further requiring closely spaced ink jet nozzle orifices and closely spaced charge electrodes. With such closely spaced streams, it is difficult to maintain the closely spaced components free of the ink, which may be electrically conductive and cause considerable shorting or electrical distortion.

This is especially true during startup and shutdown, as will be explained. During operation, a definite operating fluid pressure is required to project the ink from the nozzle orifices at sufficient velocity to overcome forces such as surface tension to create the linear jet stream filaments. At startup, a definite time period is required to bring the fluid up to sufficient pressure to form the filamentary streams. As the result, the surface tension is the dominating force resulting in a collection of a large mass of ink at the nozzle orifice as the pressure builds. As the fluid pressure increases, a jet will eventually be produced in an uncontrolled manner, possibly pushing the mass of ink with it through the charge electrodes and the remainder of the ink jet system. The jet formed in this manner stabilizes as a free jet only after any excess liquid at the orifice has been forced out or drawn away by entrainment in the jet.

During shutdown, a gradual reduction of the pressure from the operating pressure to zero first collapses the free jet and concludes with dribbling of ink from the nozzle orifice. This ink is thus spattered or flowed over various components of the ink jet head possibly shorting out electrical components and, if left to dry, leaving an undesirable residue.

Various proposals have been made toward solving this situation or reducing its effect. Examples are Culp, U.S. Pat. No. 3,618,858 which shows charge electrodes which are open-sided and thus moved out of the way during startup or shutdown and moved into and out of position while the streams are operating; Martinez et al, U.S. Pat. No. 3,661,304 which shows various separate fluid supplies for applying a pressure impulse to initially shock the fluid to initiate stream startup; and Stoneburner, U.S. Pat. No. 3,891,121 which shows a complex mechanism for pumping air into the manifold at a high pressure, following the air with a flushing fluid, and then following the flushing fluid with the ink at startup and switching from ink to a flushing fluid and then evacuating the manifold at shutdown. All of the examples add substantial hardware and complexity to either the ink jet head or to the ink supply system.

SUMMARY OF THE INVENTION

It is therefore and object of the present invention to provide a simplified ink supply system for pressurized ink jet for accomplishing a full cycle of operation of the system.

In accordance with the present invention, there is provided for a pressurized ink jet system including an ink jet head having an inlet, a pressurized ink jet system including an ink jet head having an inlet, the ink supply including a source of pressurized ink connected to the inlet by an inlet valve in sequence so that the head is initially filled with ink, the inlet valve closed, the pressure source building the pressure behind in inlet valve to a level significantly greater than required for operation, and opening the valve for starting ink jet streams from the head and allowing the pressure to decay to the stream operating pressure. For shutdown, the head includes an outlet, an outlet valve, and a vacuum source, sequenced so that the inlet valve is closed with the outlet valve open to create a negative pressure in the head.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
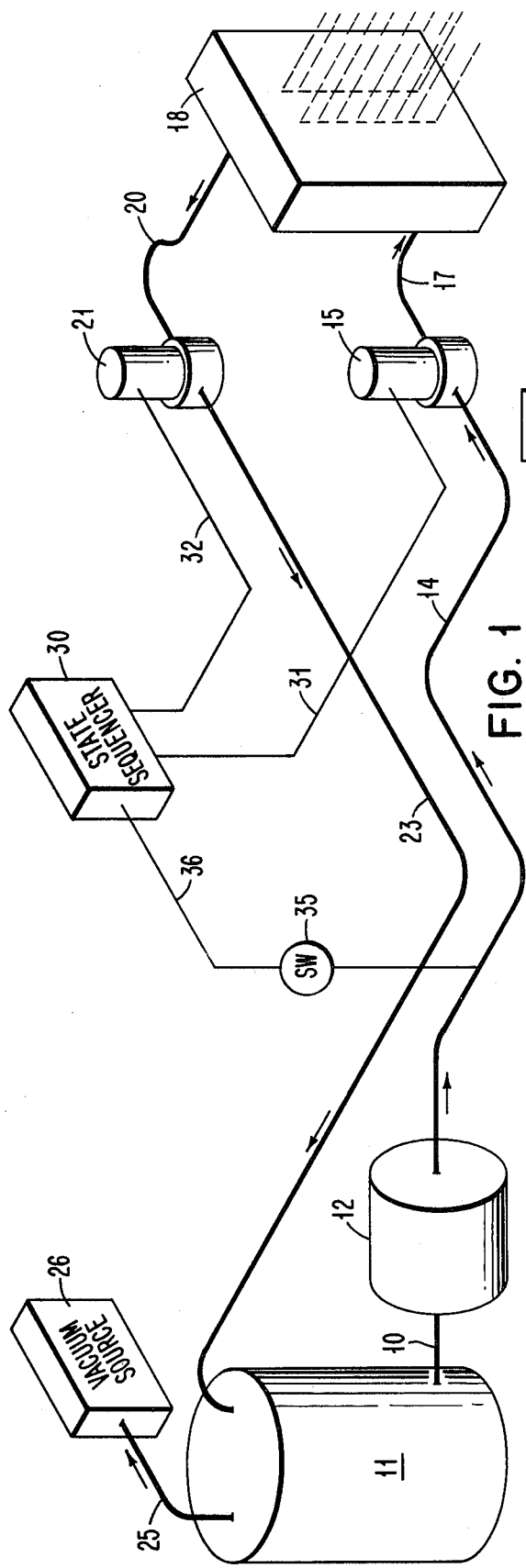
FIG. 1 is a perspective view of an ink supply system and an ink jet head constructed in accordance with the present invention.

Referring to FIG. 1, a conduit 10 is connected at one end to an outlet of an ink reservoir 11 and at the other end to an inlet of a fluid pump 12. A conduit 14 is connected at one end to an outlet of pump 12 and at the other end to an inlet of a solenoid valve 15.

Pump 12 may be any suitable type operable under generally low flow conditions at a selected pressure commensurate with the type of ink jet system, for example a suitable pressure in the range of 15-25 pounds per square inch, a specific example being 19 psi, and capable of operating under a no flow condition to produce a significantly higher pressure on the fluid in conduit 14 of, for example 60-80 pounds per square inch. The no flow condition would be established by the closing of solenoid valve 15. Although any of a wide variety of pumps may be utilized, given suitable inlet and outlet orifices, an ideal pressure regulator is illustrated in our co-pending patent application Ser. No. 689,702, filed May 24, 1976.

Solenoid valve 15 may be any suitable type operable up to a pressure of 80 psi having components compatible with the ink. A vast array of solenoid valves is available for this purpose, depending upon the ink chemistry. Flexible conduit 17 is connected at one input to the outlet of solenoid valve 15 and at the other end to an inlet of print head 18. The print head 18 may be any suitable ink jet head for use in pressurized ink jet systems.

An example of the print head designed for the binary type of system wherein startup and shutdown control is a requirement, is that described in co-pending patent application Ser. No. 632,534, filed Nov. 17, 1975, K. C. Chaudhary, entitled "Self-Cleaning Ink Jet Head", assigned in common with the present application.

Flexible conduit 20 is connected at one end to an outlet from print head 18 and at the other end to an inlet of solenoid valve 21. Solenoid valve 21 has the same requirements as, and may be identical to, solenoid valve 15. Conduit 23 is connected at one end to an outlet of solenoid valve 21 and at the other end to an inlet at the top of reservoir 11. Reservoir 11 includes a second outlet at its top which is connected by line 25 to a vacuum source 26.

A state sequencer 30 is connected by line 31 to solenoid valve 15 and by line 32 to solenoid valve 21. The sequencer may comprise any suitable arrangement for providing the appropriate electrical signals to open and close the solenoids at the appropriate times. The arrangement may range from a simple set of toggle switches operated at the appropriate times to a relatively simple arrangement of timing and logic circuits, or logic state responsive circuits responsive to an on and off switch for controlling the sequencing of the solenoid valves. One advantageous arrangement employs a pressure switch 35 which operates when the pressure in conduit 14 reaches the required high pressure for startup. The switch 35 is connected to sequencer 30 by means of line 36. With this switch, the sequencer 30 may operate as soon as the proper high pressure has been reached, rather than waiting a predetermined time estimated to be sufficient for pump 12 to produce the higher pressure in the conduit 14, plus some safety factor.

In operation, with a constant flow pumping system without a pressure relief valve operable below the high pressure required for startup, and once all the parameters of the system are set relating the operating pressure to the size and number of nozzles in the print head 18, all operating conditions can be achieved as a function of opening and closing solenoid valves 15 and 21. In the instant case, four different pressure conditions can be created at the head 18 by changing the fluidic resistance of the system simply by actuating the solenoid valves. These conditions are as follows:

A. — PURGE — In the operation of ink jet, it has been found advantageous to purge any air from the head 18 prior to startup. Thus, the first operation in startup sequence comprises the operation of sequencer 30 to provide signals on lines 31 and 32 to open both solenoid valve 15 and solenoid valve 21 with pump 12 operating. This results in a low pressure condition on conduits 14, 17 and 20, and in head 18, all created by the low fluidic resistance of the system, in which a flow is established through the system but not out the head nozzle orifices. Any air from the head is thus forced into reservoir 11 and largely drawn off by vacuum source 26. The pressure in the head is insufficient to overcome the surface tension of the ink at the nozzle orifices, thus holding the ink in the head.

B. — STARTUP — First, both solenoids 15 and 21 are closed to trap fluid in the head cavity and prevent the introduction of any air into the head. Shutting solenoid 15 also prevents the escape of any fluid from duit 14. Pump 12 therefore automatically increases the pressure upstream of solenoid valve 15 in conduit 14. When the pressure reaches the required high pressure for startup, switch 35 closes, providing a signal on line 36 to sequencer 30. Sequencer 30 responds by opening solenoid valve 15. Opening solenoid valve 15 at the high pressure, such as 60 psi, creates an instantaneous surge in head 18, thus cleanly starting the ink jet streams.

C. — OPERATION — No change is made in the solenoid valves. Automatically, with solenoid valve 15 open and solenoid valve 21 closed, the ink flow in the form of streams causes the pressure to decay from that of startup to the operating pressure created by the fluidic resistance of the nozzle orifices.

D. — SHUTOFF — In response to operating the switch to off, sequencer 30 closes solenoid valve 15 and opens solenoid valve 21. Closing solenoid valve 15 discontinues the pressure on conduit 17 from pump 12, and opening solenoid valve 21 transmits a negative pressure from vacuum source 26, via conduits 25, 23 and 20 to head 18. A nearly instantaneous negative pressure is thus created in head 18, thereby achieving a dripless shutoff of the head. At this time pump 12 may be turned off. It has been found that either simultaneous operation of both valves or biasing the opening of valve 21 first by a few milliseconds produces the desired results. It has been found that a startup works reasonably with a ratio of increased pressure for startup to the operating pressure of 3 to 1 or better, subject to physical limitations of the head. This means that at an operating pressure of 20 psi, the increased pressure required for a clean startup must be at least 60 psi. Physical limitations of the head which provide an upper bound for the increased pressure for startup are such things as possible breakage of the nozzle plate in a multi-orifice head 18 or leakage of various components of the system.

It may be advantageous to go to the purge state after shutdown in order to fill the head with ink and thus prevent any possible drying of ink inside the head due to air bubbles drawn in through the nozzles. In any case, it is desirable to again go to the purge state prior to startup to ensure that no air bubbles are in the head and to clean any debris that may have accumulated inside the head.

Figure 2:
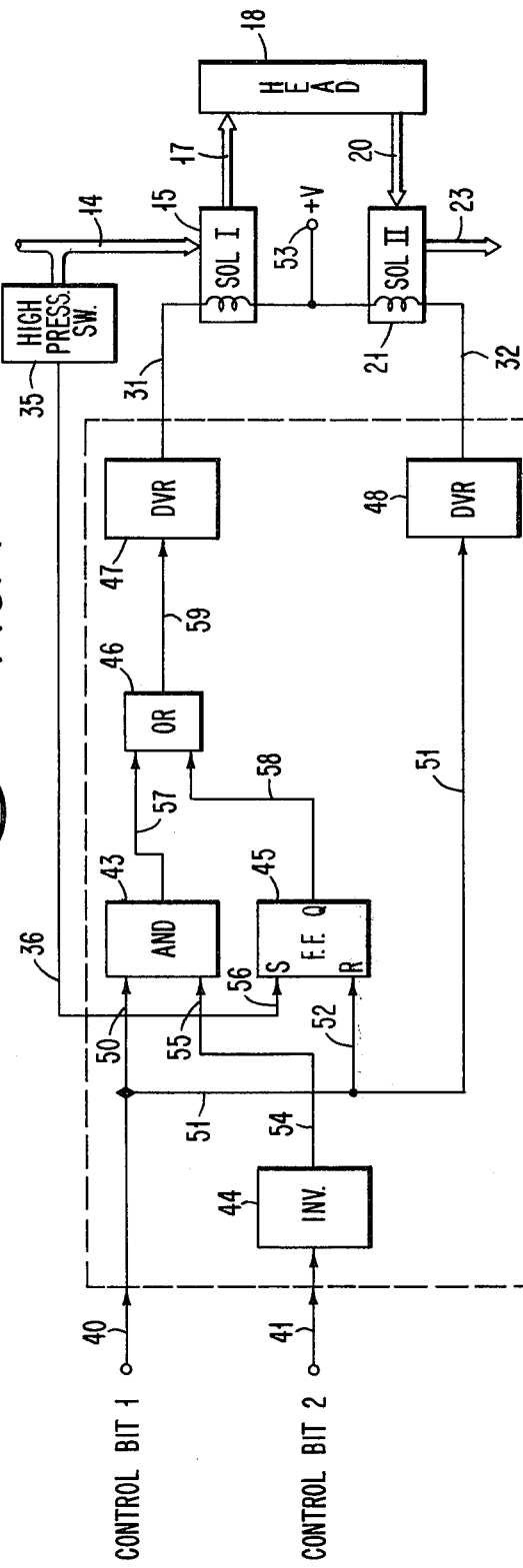
FIG. 2 is a schematic view of the state sequencing and valving arrangement of FIG. 1.

Referring to FIG. 2, an example of the state sequencer 30 of FIG. 1 is illustrated, together with the valving arrangement of FIG. 1. The inputs to the state sequencer 30 are illustrated as a control bit 1 on line 40 and a control bit 2 on line 41. The control bits are supplied from manual switches or from a control switching mechanism for a complete printer, including ink jet charge electrode drive circuitry, paper drive circuitry, etc. As will be described subsequently, a signal on line 40 represents the purge state, a signal on line 41 represents the startup and operate states, and signals on both lines 40 and 41 represent the shutdown state.

State sequencer 30 includes an AND circuit 43, an inverter 44, a flip-flop circuit 45, an OR circuit 46, and drivers 47 and 48. Line 40 is connected to input 50 of AND circuit 43 and is connected via line 51 to driver 48 and to reset input 52 of flip-flop 45. Driver 48 is thus actuated so long as a signal is present on line 40 to provide a positive drive signal on line 32 opening solenoid 21. The absence of a signal on line 40 operates driver 48 to provide a negative drive signal on line 32 to a positive voltage source 53, thereby driving the solenoid 21 to the closed state.

Line 41 is connected to inverter 44, which inverts any signal on line 41 and provides the output on line 54 to input 55 of AND circuit 43. The set input 56 of flip-flop 45 is connected from high pressure switch 35 by line 36. Flip-flop 45 is reset only by a positive-going waveform at input 52, and is set only by a positive-going waveform at input 56. Thus, a positive-going signal on line 40 resets flip-flop 45. A subsequent positive signal from high pressure switch 35 will then set flip-flop 45. The flip-flop will then remain set until reset only after the signal on line 40 is discontinued and another positive-going signal provided.

AND circuit 43 is connected to OR circuit 46 by line 57 and the output of flip-flop 45 is connected to OR circuit 46 by line 58. Line 59 connects OR circuit 46 to 47. Driver 47 is identical to driver 48 and operates solenoid 15 to the open condition by a positive drive signal on line 31, and operates solenoid 15 to the closed state by a negative drive signal on line 31 to positive voltage source 53.

The operation of the circuitry of FIG. 2 may be illustrated by reference to the following truth table:

| | POWER ON | PURGE | STARTUP I | STARTUP II & OPERATE | SHUTDOWN |
|---|---|---|---|---|---|
| STATE | 0 | 1 | 2A | 2B | 3 |
| INPUTS | | | | | |
| CB 1 | 0 | 1 | 0 | 0 | 1 |
| CB 2 | 0 | 0 | 1 | 1 | 1 |
| PR SW | X | X | 0 | 1 | X |
| OUTPUTS | | | | | |
| SOL I | 0 | 1 | 0 | 1 | 0 |
| SOL II | 0 | 1 | 0 | 0 | 1 |

No net change occurs to solenoid valves 15 and 21 is assuming the power on condition "0", in that both valves remain closed, preventing any fluid flow into or out of head 18, via conduits 17 or 20. In the power on condition, pump 12 remains off and no input is provided on line 40 or on line 41. No input signal is therefore present on line 40 to input 50 of AND circuit 43, to reset input 52 of flip-flop 45, or on line 51 to driver 48. Driver 48 responds by providing a positive drive signal on line 32, causing solenoid 21 to remain closed. The lack of an imput signal at input 50 of AND circuit 43 blocks the AND circuit from providing an output signal on line 57 to OR circuit 46. The absence of a signal on line 41 is inverted by inverter 44 to supply a signal on line 54 to input 55 of AND circuit 43. So long as AND circuit 43 is blocked by the absence of a signal on line 50, no signal is supplied at line 57 to OR circuit 46. Similarly, flip-flop 45 is assumed to be in the reset state which results in the absence of a signal on line 58 to OR circuit 46. The OR circuit thus cannot supply a signal on line 59 to driver 47, such that the driver 47 thus supplies only a positive signal on line 31, which is offset by the positive voltage at input 53, thereby maintaining solenoid 15 in the closed condition.

The purge state "1" is attained by supplying a control bit 1 signal on line 40 without a control bit 2 signal on line 41. The signal on line 40 is transmitted by line 51 to driver 48, thereby causing the driver to supply a negative signal on line 32. The resultant current operates solenoid 21 to the open condition to allow fluid flow from conduit 20 to conduit 23. The signal on line 40 is also supplied to input 50 of AND circuit 43. This signal in combination with the inverted signal from inverter 44 on line 54 to input 55, operates the AND circuit to supply an output signal on line 57. This signal is transmitted by OR circuit 46 on line 59 to driver 47. Driver 47 then goes negative so that the resultant current on line 31 operates solenoid 15 to open and allow flow from conduit 14 to conduit 17. The pump is also turned on at this time causing a resultant flow on conduit 14, through head 18 and out conduit 23, thereby purging any air or debris from the head. The signal on line 40 is also supplied on line 51 to reset input 52 of flip-flop 45, the positive-going nature of the waveform resetting the flip-flop, if it was not already in the reset state.

For startup, control bit 1 is turned off and control bit 2 is turned on. As in state "2A" above, control bit 1 is supplied on input 40 and thus terminates the signal at input 50 of AND circuit 43. This causes the AND circuit to drop its output signal, via OR circuit 46, to driver 47. The driver therefore terminates the negative output and results in the closing of solenoid 15. Similarly, the lack of a signal on line 51 at the input to driver 48 causes that driver to terminate its input to solenoid 21, thereby closing that solenoid. The application of control bit 2 at input 41 also causes inverter 44 to drop its signal at input 55 of AND circuit 43. With solenoids 15 and 21 both closed, the fluid supplied during the purge step is retained in head 18 and shutting off the flow at the end of conduit 14 causes the pump to increase the pressure of the fluid in the conduit.

Upon the pressure in conduit 14 increasing to the predetermined high pressure, high pressure switch 35 operates to supply a signal on line 36 to input 56 of flip-flop 45. This is shown above as state "2B". The positive-going signal operates to set the flip-flop which then provides an output signal on line 58. The output signal is transmitted by OR circuit 46 on line 59 to driver 47. Driver 47 therefore supplies a negative actuating signal to draw current from source 53 on line 31 to open solenoid 15 and allow the pressure wave from conduit 14 to be transmitted on conduit 17 to head 18. Solenoid 21 remains closed so that the pressure gradually decays as the result of ejection of the fluid from the nozzle orifices in head 18, until the operating pressure is reached. This pressure is a stable condition as controlled by a regulator on the fluid pump so that the system continues to operate with solenoid 15 open and solenoid 21 closed.

For shutdown, state "3", control bit 1 is supplied at input 40 and on line 51 to driver 48. Driver 48 thereupon operates solenoid 21 to the open condition, connecting the interior of head 18 to the vacuum source which is connected to conduit 23. The control bit signal is also supplied to input 50 of AND circuit 43, but the absence of a signal at input 55 due to control bit 2 on line 41 prevents the AND circuit from operating. The control bit 1 signal is also supplied to the reset input 52 of flip-flop 45, the positive-going nature of the input resetting the flip-flop to terminate the signal on line 58. The termination of this signal, via OR circuit 46, discontinues the operation of driver 47 to thereby close solenoid 15 and block the pressure from conduit 14 from reaching head 18. At this time, the pump may also be shut down.

As previously discussed, it may then be convenient to go to the purge state to ensure that the head 18 is filled with fluid.

In each instance where the pump is "off", above, an alternative is to employ a suitable by-pass system which is opened at the appropriate times.

While the invention has been particularly shown and described with reference to a preferred embodiment thereof, it will be understood by those skilled in the art that various changes in the form and details may be made therein without departing from the spirit and scope of the invention.

What is claimed is:

1. In a constant flow pressurized ink jet system including an ink jet head for forming at least one ink jet and having an inlet, an inlet valve, and a constant flow source of pressurized fluid connected to said inlet by said inlet valve, the method of attaining startup of said ink jet system with said head initially filled with fluid comprising the steps of:
   closing said inlet valve;
   said constant flow source increasing the pressure of said fluid upstream of said inlet valve to a pressure substantially greater than required for operation; and
   opening said inlet valve to transmit said increased pressure to said head for starting said at least one ink jet, said presure decaying to that required for operation, sustaining said at least one ink jet.

2. The method of claim 1 wherein said ink jet head additionally includes an outlet, and said ink jet system additionally includes an outlet valve connected to said outlet, said method comprising additionally:
   initially filling said head with fluid and purging air therefrom by flowing said fluid from said pressure source through said inlet valve, said head and said outlet valve; and
   said closing step additionally comprises closing said outlet valve.

3. The method of claim 2 wherein:
   said increased pressure is at least four times said pressure required for operation.

4. The method of claim 3 wherein:
   said increased pressure is approximately 80 psi; and
   said pressure required for operation is approximately 15 psi.

5. The method of claim 2 additionally including the step of
   sensing that said pressure of said fluid upstream of said inlet valve reaches said substantially increased pressure; and
   said opening step occurs in response to said sensing step.

6. The method of claim 2 for additionally attaining shutoff of said ink jet system, wherein said ink jet system additionally includes a source of vacuum connected to said outlet by said outlet valve, comprising the additional step susequent to said operation of:
   simultaneously closing said inlet valve and opening said outlet valve to block said fluid pressure from said head and to transmit the vacuum from said vacuum source to said head.

7. A method of attaining startup of fluid jet streams from a jet head having nozzle orifces, comprising the steps of:
   filling said head with a fluid at a pressure insufficient to eject said fluid through said nozzle orifices;
   closing off said head to said fluid;
   pressurizing said fluid upstream of said head to a pressure substantially greater than required for operation, which is that required for ejecting said fluid through said nozzle orifices in fluid jet streams; and
   opening said head to said greater pressurized fluid for starting said fluid jet streams, said greater pressure decaying to said pressure required for operation.

8. The method of claim 7 wherein:
   said greater pressure is at least four times said pressure required for operation.

9. The method of claim 8 wherein:
   said greater pressure is approximately 80 psi; and
   said pressure required for opertion is approximately 16 psi.

10. Apparatus for attaining startup of at least one fluid jet stream through at least one nozzle orifice in an ink jet head with said head initially filled with fluid, comprising:
    an inlet in said ink jet head;
    an inlet valve means connected to said inlet;
    a constant flow source of pressurized fluid connected to said inlet valve means; and
    sequencing means for closing said inlet valve means a sufficient time such that said constant flow source increases the pressure of said fluid upstream of said inlet valve means to a pressure substantially greater than required for operation, said operation pressure being that which would sustain said at least one fluid jet stream, and then opening said inlet valve means to transmit said increased pressure to said head for starting said at least one fluid jet stream.

11. The apparatus of claim 10:
    additionally comprising sensing means for sensing said fluid upstream of said inlet valve means reaching said substantially greater pressure; and
    said sequencing means comprises means for closing said inlet valve means, causing said constant flow source to increase the pressure of said fluid upstream of said inlet valve means, and means responsive to said sensing means sensing said substantially greater pressure for opening said inlet valve means to transmit said increased pressure to said head for starting said at least one fluid jet stream.

12. The apparatus of claim 10 wherein:
    said constant flow source produces said increased pressure of a value of at least four times said operation pressure.

13. The apparatus of claim 10, without said head being initially filled, additionally comprising:
    an outlet in said ink jet head;
    an outlet valve means connected to said outlet; and
    said sequencing means additionally comprises means for initially opening said inlet valve means and said outlet valve means to cause said fluid source to flow said fluid through said inlet valve means, said head and said outlet valve means, thereby filling said head with fluid and purging air therefrom, and for closing said inlet valve means and additionally closing said outlet valve means.

14. The apparatus of claim 13 for additionally attaining shutoff of said at least one fluid jet stream comprising additionally:

a source of vacuum connected to said outlet valve means; and said sequencing means additionally includes means for simultaneously closing said inlet valve means and opening said outlet valve means and opening said outlet valve means to block said fluid pressure from said head and to transmit the vacuum from said vacuum source to said head.

* * * * *